United States Patent [19]
Doden et al.

[11] 3,862,807
[45] Jan. 28, 1975

[54] DISENGAGEABLE UNIVERSAL JOINT CONSTRUCTION

[75] Inventors: Hans-Jürgen Doden, Lemforde/Hann; Jürgen Ulderup, Haldem, both of Germany

[73] Assignee: Lemforder Metallwaren AG, Lemforde/Hann, Germany

[22] Filed: July 13, 1973

[21] Appl. No.: 379,196

[30] Foreign Application Priority Data
July 21, 1972   Germany.............................. 2235874

[52] U.S. Cl................................. 403/135, 403/144
[51] Int. Cl. ............................................ F16c 11/06
[58] Field of Search ............ 403/143, 139, 135, 140, 403/124, 144, 126, 127, 125; 91/507; 92/187

[56] References Cited
UNITED STATES PATENTS

| | | | |
|---|---|---|---|
| 2,695,185 | 11/1954 | Latzen | 403/140 |
| 2,708,590 | 5/1955 | Latzen | 403/135 X |
| 2,856,250 | 10/1958 | Thoma | 403/144 X |
| 2,879,091 | 3/1959 | Baker | 403/124 |
| 3,226,141 | 12/1965 | Sullivan | 403/135 |
| 3,787,128 | 1/1974 | Maistrelli | 403/135 |

*Primary Examiner*—Geo V. Larkin
*Attorney, Agent, or Firm*—McGlew and Tuttle

[57] ABSTRACT

A disengageable universal joint comprises a receiving member having a receiving socket with a spherical engagement surface and an opening to the engagement surface and with an annular holding ring receiving recess defined inwardly of the opening. A spring ring or holding ring is disposed in the recess and may be expanded outwardly to permit entrance of a ball member having a larger diameter then the ring when the ring is in a relaxed state. The recess of the receiving member is widened outwardly in respect to the axis of the ball member in a direction inwardly of the opening of said member in order to permit the spring ring to move outwardly and expand its internal diameter to receive the ball member but to cause the spring ring to move downwardly on the smaller diameter portion of the recess and to contract and hold the ball member in position against disengagement.

4 Claims, 3 Drawing Figures

PATENTED JAN 28 1975

3,862,807

DISENGAGEABLE UNIVERSAL JOINT CONSTRUCTION

BACKGROUND OF THE INVENTION

1. Field of the Invention

This invention relates in general to the construction of universal joints and, in particular, to a new and useful disengageable ball joint particularly for control linkages of motor vehicles which includes a ball which is rotatable within a receiving bearing and which is retained by a spring ring arranged in an annular groove which widens outwardly in an inward direction in respect to the receiving socket to permit access of the ball, but which is shaped to cause an inward movement of the ring in a reduction of its internal diameter to retain the ball once it is positioned within the joint housing.

2. Description of the Prior Art

At the present time ball joints or universal joints are known which include ball pins which are retained in the receiving socket of an articulated member of a linkage by various means such as retaining rings, securing nuts, etc. A disadvantage of the known constructions is that they are expensive and the assembly of the joint parts is difficult and costly. In addition, the fact that it is difficult to assemble the ball head into the receiving socket of the joint, there is also the danger in the known constructions that the ball may become disassociated from the receiving socket during operation.

SUMMARY OF THE INVENTION

The present invention provides a universal joint construction in which a ball member is engaged in a receiving socket and held in position thereby by a spring ring which rides in an annular groove located adjacent the opening through the receiving socket. The ball head of one of the joint parts may be pressed, during assembly, into the joint housing of the other part by pressing the head through a wear-resistant spring ring which expands into the recess of the receiving socket. In accordance with a feature of the invention, the receiving socket is provided with a diameter which is larger than the ring so as to permit the ring to expand when the ball head is pressed into the receiving socket and to contract again when the ball has reached its end position engaged on the spherical receiving surface of the socket. The construction of the invention is such that the ring receiving recess of the socket widens in a direction away from the opening so that the ring is free to expand outwardly fully to permit access of the socket, but when the ball is moved in an opposite direction to withdraw it from the socket it moves the ring downwardly to compress it and narrow the internal diameter thereof and retain the ball in the socket. The construction ensures that the ball will not be disengaged from the socket accidentally because an outward pull on the ball will cause the ring to move down to the smaller diameter portion of the receiving recess so that it cannot expand outwardly to permit passage of the ball member.

In the preferred form of the invention, the receiving recess including a rectangular cross section widened diameter portion and a lower portion toward the opening which is beveled inwardly in the direction of the opening. Thus, the split safety ring can yield freely and easily upwardly or inwardly into the receiving socket because it may expand in that direction outwardly to the widened diameter portion of the receiving recess. The ball head may not be deliberately or accidentally disengaged from the receiving socket due to the fact that the ring is moved down to the converging lower portion of the recess so that much greater forces are required to effect removal. The higher retention force may be set so that there can be no accidental separation of the joint parts during operation.

Accordingly, it is an object of the invention to provide an improved universal joint construction which includes a split ring which rides in a groove of a receiving socket housing into which is engaged a ball member and wherein the receiving recess widens in a direction opposite to the opening direction of the recess to permit easy insertion of the ball member through the interior of the split ring which is displaced outwardly into the recess for insertion but which moves downwardly into the narrow diameter portion of the recess to prevent withdrawal of the ball member after it has been initially seated.

A further object of the invention is to provide a universal joint construction which is simple in design, rugged in construction and economical to manufacture.

For an understanding of the principles of the invention, reference is made to the following description of a typical embodiment thereof as illustrated in the accompanying drawing.

GENERAL DESCRIPTION OF THE PREFERRED EMBODIMENT

Figure 1:
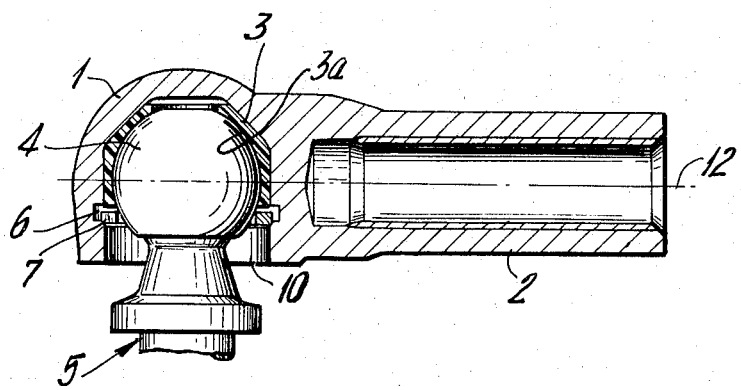
FIG. 1 is a longitudinal sectional view of a universal joint construction in accordance with the invention.

Referring to the drawings in particular, the invention embodied therein comprises a universal joint which includes a joint housing or socket receiving member 1 which includes a connecting piece or link 2. The receiving socket 1 includes a receiving recess with an opening 10 and with an interior receiving socket portion which is provided with a bearing shell 3 made of an elastic low-friction material such as a plastic and which includes a spherical receiving surface 3a. A ball member 5 having a spherical ball end 4 engages on the spherical receiving surface 3a of the bearing shell 3.

Figure 3:
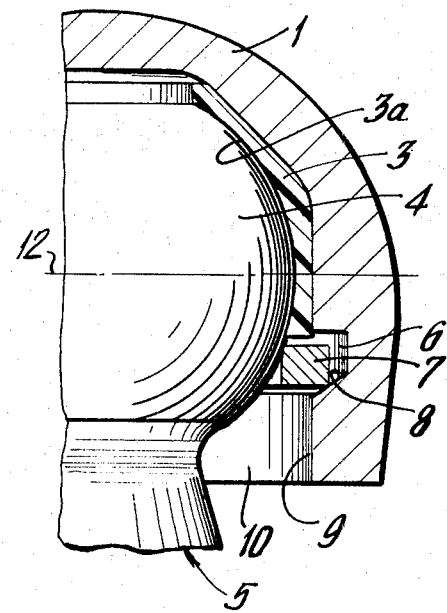
FIG. 3 is an enlarged view of the joint shown in FIG. 1 with the ball member seated within the spherical receiving surface.

The housing includes a horizontal or central axis 12 which corresponds generally to the axis of the ball member when it is seated in the socket as shown in FIGS. 1 and 3. In accordance with the invention, the socket is provided with an annular groove 6 which receives a split spring ring 7. The bottom surface 8 of the annular groove 6 is tapered inwardly in a direction toward the opening 10, i.e., in a direction opposite to the interior of the receiving socket. Below the groove 6 the socket member is provided with a uniform diameter portion 9.

Figure 2:
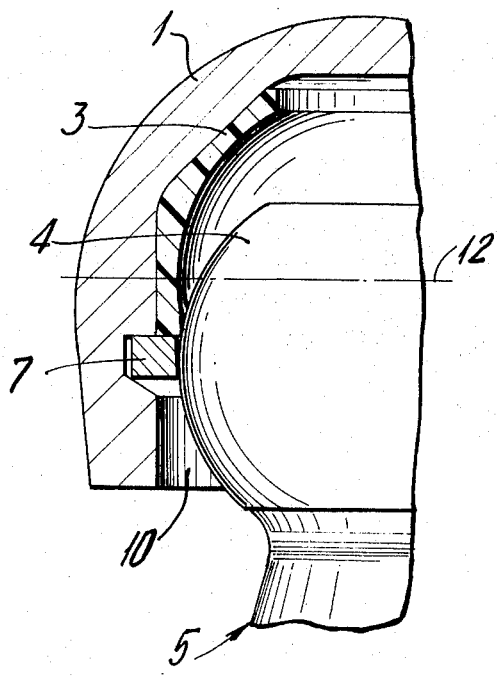
FIG. 2 is an enlarged partial sectional view of the joint shown in FIG. 1 indicating the insertion of the ball member into the joint.

The split spring ring 7 has an internal diameter which is smaller than the diameter of the ball head 4 when it is in a relaxed state but which can widen by expansion of the ring upwardly into the widened diameter upper portion of the recess 6. The split spring ring 7 is shown in an outwardly expanded position permitting access of the ball head 4 in FIG. 2. Once the ball is seated in the receiving surface 3a, the split spring ring 7 may contract on the narrower diameter portion of the ball head below the central axis 12 and move downwardly on the tapered smaller diameter portion 8 of the recess 6. When in this position, if the ball head is moved in a downward or outward direction, the ring moves further down on the tapered portion 8 of the recess and causes a tightening of the split spring ring 7 and the reduction of its diameter so that the ball is held securely against withdrawal. In this position, the ring 7 offers a greater resistance to withdrawal of the ball 4 so that it is not likely that the ball will be removed during the operation of the device. The design of the joint is extremely simple and the production costs of such a massed produced article is rather low.

While a specific embodiment of the invention has been shown and described in detail to illustrate the application of the principles of the invention, it will be understood that the invention may be embodied otherwise without departing from such principles.

What is claimed is:

1. A disengageable universal joint, comprising a first receiving member having a receiving socket with a spherical engagement surface and an opening to said engagement surface and having an annular holding ring receiving recess located inwardly of the opening, a split spring ring disposed in said recess, a ball member having an engagement ball having a spherical surface engageable in the spherical engagement surface of said receiving member, the internal diameter of said split spring ring being smaller than said ball member diameter in a relaxed state, said ring being expandable into said recess to permit access of said ball member through the receiving member opening, the recess of said receiving member being widened outwardly from the axis of said ball member proceeding in a direction inwardly from the opening of said receiving member whereby the ring may be displaced axially inwardly of the receiving member joint to cause it to move radially outwardly into the widened diameter portion of the recess and permit access of the ball member but once the ball member is seated on the spherical engagement surface it may relax inwardly to hold the ball member in position and which will be urged downwardly and toward the opening and inwardly upon attempts to remove the ball member so that its internal diameter is reduced and prevents withdrawal of the ball member.

2. A disengageable universal joint according to claim 1, wherein said receiving member includes an interior lining of a plastic material defining said spherical engagement surface.

3. A disengageable universal joint according to claim 1, wherein said recess includes a rectangular cross section widened diameter portion and a portion closer to the opening of said receiving member with an oblique inwardly extending surface.

4. A disengageable universal joint according to claim 1, wherein, in contrast to the cross section of said split spring ring, the annular receiving recess is inwardly bevelled in the direction in which said ball member can be removed through the opening, said bevel providing an oblique slide surface of said spring ring which acts to close said ring upon withdrawal movement of said ball member so as to offer greater resistance to removal of the ball member under the action of forces occurring during operation, but which permits complete removal of the ball member upon increased traction force and inward holding pressure on said split spring ring.

* * * * *